United States Patent
Mast et al.

(10) Patent No.: US 9,605,778 B2
(45) Date of Patent: Mar. 28, 2017

(54) EXTRUDED ENCAPSULATED FILLERS TO PROVIDE CRUSH PROTECTION

(71) Applicant: Oceaneering International, Inc., Houston, TX (US)

(72) Inventors: Stephen Owen Mast, Cypress, TX (US); Fraser Hynd Thomson, Kinross (GB); Rosianita Balena, Rio de Janeiro (BR); Flavio Vasconcelos, Rio de Janeiro (BR)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 14/290,210

(22) Filed: May 29, 2014

(65) Prior Publication Data

US 2015/0036988 A1    Feb. 5, 2015

Related U.S. Application Data

(60) Provisional application No. 61/861,796, filed on Aug. 2, 2013.

(51) Int. Cl.

| | |
|---|---|
| *G02B 6/44* | (2006.01) |
| *F16L 11/10* | (2006.01) |
| *F16L 9/12* | (2006.01) |
| *H02G 3/04* | (2006.01) |
| *F16L 11/22* | (2006.01) |

(52) U.S. Cl.
CPC ............... *F16L 11/10* (2013.01); *F16L 9/12* (2013.01); *F16L 11/22* (2013.01); *G02B 6/4427* (2013.01); *G02B 6/4488* (2013.01); *H02G 3/0406* (2013.01); *G02B 6/443* (2013.01); *G02B 6/4483* (2013.01); *Y10T 29/4998* (2015.01); *Y10T 29/49826* (2015.01); *Y10T 29/49879* (2015.01)

(58) Field of Classification Search
CPC .......................................... F16L 11/10
See application file for complete search history.

(56) References Cited

U.S. PATENT DOCUMENTS

| | | | | |
|---|---|---|---|---|
| 3,710,006 A | * | 1/1973 | Davis ..................... | G01V 1/201 174/101.5 |
| 4,153,332 A | * | 5/1979 | Longoni .............. | G02B 6/4413 385/111 |

(Continued)

OTHER PUBLICATIONS

Jassal et al., "Aramid fibers—An overview", Sep. 2002, Indian Journal of Fibre & Textile Research, vol. 27, pp. 290-306.*

*Primary Examiner* — Sung Pak
(74) *Attorney, Agent, or Firm* — Maze IP Law, PC

(57) ABSTRACT

In various embodiments, a tubular comprises a tubular outer sheath defining an inner void; one or more core elements or assemblies disposed within the inner void; and a substantially solid filler in various embodiments disposed within and substantially filling the inner void, where the filler is adapted to give the tubular hoop strength in a crush situation and comprises a polymer with a density of at least 1.0. In some embodiments, these core assemblies comprise an extruded polymer layer typically extruded about core elements in a single pass, fitting about them without a sharp edge and defining an outer shape. The resulting tubular can comprise multiple regions which, though substantially filled, are filled with differing fillers densities.

11 Claims, 5 Drawing Sheets

(56) References Cited

U.S. PATENT DOCUMENTS

| | | |
|---|---|---|
| 4,196,307 A | 4/1980 | Moore et al. |
| 4,606,604 A | 8/1986 | Soodak |
| 4,676,590 A * | 6/1987 | Priaroggia ............ G02B 6/4407 |
| | | 174/70 R |
| 4,974,926 A * | 12/1990 | Blee .................... G02B 6/4492 |
| | | 385/107 |
| 5,630,003 A | 5/1997 | Arroyo |
| 2,892,874 A | 4/1999 | Houghton |
| 6,046,404 A | 4/2000 | Figenschou et al. |
| 6,350,947 B1 * | 2/2002 | Bertini ................. H01B 7/2813 |
| | | 174/47 |
| 6,671,441 B1 | 12/2003 | Bocanegra et al. |
| 6,714,709 B1 * | 3/2004 | Birkeland ............ G02B 6/4427 |
| | | 385/111 |
| 8,335,417 B2 | 12/2012 | Register, III |
| 2008/0185138 A1 | 8/2008 | Hernandez-Solis et al. |
| 2008/0190643 A1 * | 8/2008 | Lumachi .................. H01B 3/30 |
| | | 174/107 |
| 2008/0233318 A1 | 9/2008 | Coyle |
| 2010/0044068 A1 | 2/2010 | Deighton |
| 2010/0101676 A1 | 4/2010 | Quigley et al. |
| 2010/0186988 A1 | 7/2010 | Jeroense et al. |
| 2012/0241040 A1 | 9/2012 | Fogg |
| 2013/0048373 A1 | 2/2013 | Fogg |
| 2013/0051740 A1 | 2/2013 | Fogg |

\* cited by examiner

EXTRUDED ENCAPSULATED FILLERS TO PROVIDE CRUSH PROTECTION

RELATION TO PRIOR APPLICATIONS

This application claims the benefit of Provisional Application 61/861,796 for "System and Method for Adjusting the WDR Ration of Umbilicals By Varying Density of Fillers," filed Aug. 2, 2013.

FIELD OF THE INVENTION

The invention relates to strengthening and protecting components disposed within a flexible tubular. More specifically, this invention relates to use of an extruded polymer shape disposed about an internal core element disposed within the flexible tubular, e.g. an umbilical, to provide crush stiffness to the internal core element, for example use of an extruded polymer shape disposed about an armor wire used for tensile strengthening when disposed about the internal core element.

BACKGROUND OF THE INVENTION

Polymeric fillers are a necessary part of the geometry of most flexible tubulars, such as umbilicals, and are used as packing, often as round, separate components disposed within the tubular. However, because most filler plastics used in the construction of umbilicals have a specific gravity of less than or equal to 1.0, it becomes costly and/or difficult to design umbilicals which meet specific weight requirements or weight-to-diameter ratios. Desired weight considerations can include suitability for dynamic and/or seabed stability, and will often result in having to add additional armor passes, which in turn increases the outer diameter (OD) of the umbilical. This adds additional cost and, more importantly, adds additional weight which in turn increases the tensile loading of the umbilical and often puts more strain on the internal core elements, resulting in larger crush forces during installation and recovery.

Current umbilical art also requires maintaining a high density in an umbilical, which may make it more stable while hanging from the platform or on the sea floor. Because many plastics comprise densities close to the density of water and because there is typically a lot of open space in an umbilical, manufactures are often forced to use a significant amount of armor, e.g. steel or other metal, on the umbilical to increase its density. However, as the amount of armor needed for density is increased, the total amount of armor also rises to be able to hold up the weight of the umbilical, resulting in a larger umbilical larger. When the umbilical is installed, this extra weight may present a significant load and the deploying mechanism, e.g. a vessel, has to apply a large crush tension (normal force) to keep the umbilical from slipping through the deploying device. This crush load may be high and damage interior core elements such as hoses, reducing the lifespan of the umbilical and its core components.

Accordingly, current art typically uses polymeric fillers as packing around internal components. These internal components may be stranded together in a helix and a layer of polymeric fillers such as polyethylene extruded over them; the components may then be stranded, often in an S-Z pattern over an internal core. An extruded sheath is then disposed over the bundled components with armor such as steel rods stranded over the outside, e.g. helically. Finally, another sheath is extruded over the armor. This design has shortcomings. For example, a high density in the umbilical is required, making it more stable while hanging from the platform or on the sea floor because the plastic used is very close to the density of water and there is a lot of open space in the umbilical. This, in turn, requires use of a lot of armor on the umbilical to increase its density but as the amount of armor increases for density an even greater amount of armor is required to be able to hold up the weight of the umbilical, making the umbilical larger. Another shortcoming is that an umbilical being installed is often gripped by a tensioner while up to 2500 m of umbilical are hanging off the end of the vessel. This is a significant load for the cable and the vessel has to apply a large crush tension (normal force) to keep the umbilical from slipping through the tensioner. This crush load can damage internal umbilical components such as hoses and reduces the lifespan of those components.

BRIEF DESCRIPTION OF THE FIGURES

The figures supplied herein disclose various embodiments of the claimed invention.

DETAILED DESCRIPTION OF VARIOUS EMBODIMENTS

In general, as will be understood by those of ordinary skill in the umbilical arts, "sheaths" are also sometimes referred to as outer extrusions or jackets and may comprise polyethylene, polyurethane or other suitable thermoplastic. A "core element" such as core element 32 in FIG. 1 may comprise a functional element such as a hose, electrical cable, fiber optic bundle, steel tube, or the like, or a combination thereof. Many such functional elements may be present and may further be configured as desired, e.g. in a helix strand or an S-Z pattern.

Figure 1:
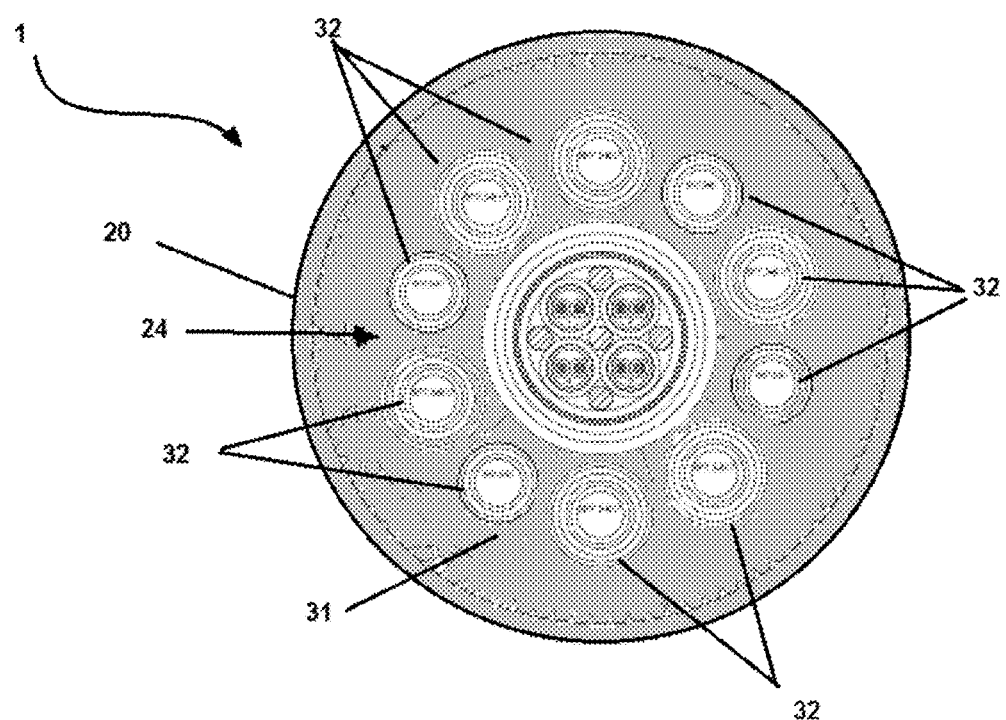
FIG. 1 is a cross sectional view in partial perspective of an embodiment of a flexible tubular comprising an outer sheath, inner sheath, functional components, and substantially solid filler.

Referring now to FIG. 1, tubular 1, which can be a flexible tubular such as an umbilical suitable for subsea use, comprises tubular outer sheath 20, defining inner void 24; one or more core elements 32 disposed within inner void 24; and substantially solid filler 31 disposed within and substantially filling inner void 24.

Filler 31 typically comprises a polymer having a density of at least 1.0. The polymer typically comprises a high density polyethylene and may be selected or otherwise configured to provide impact and fatigue protection for one or more core elements 32, e.g. hose 32a (FIG. 2), electrical conductor 32b (FIG. 2), or fiber optic conductor 32c (FIG. 2), as well as configured to give tubular 1 a predetermined characteristic such as predetermined hoop strength in a crush situation.

Figure 2:
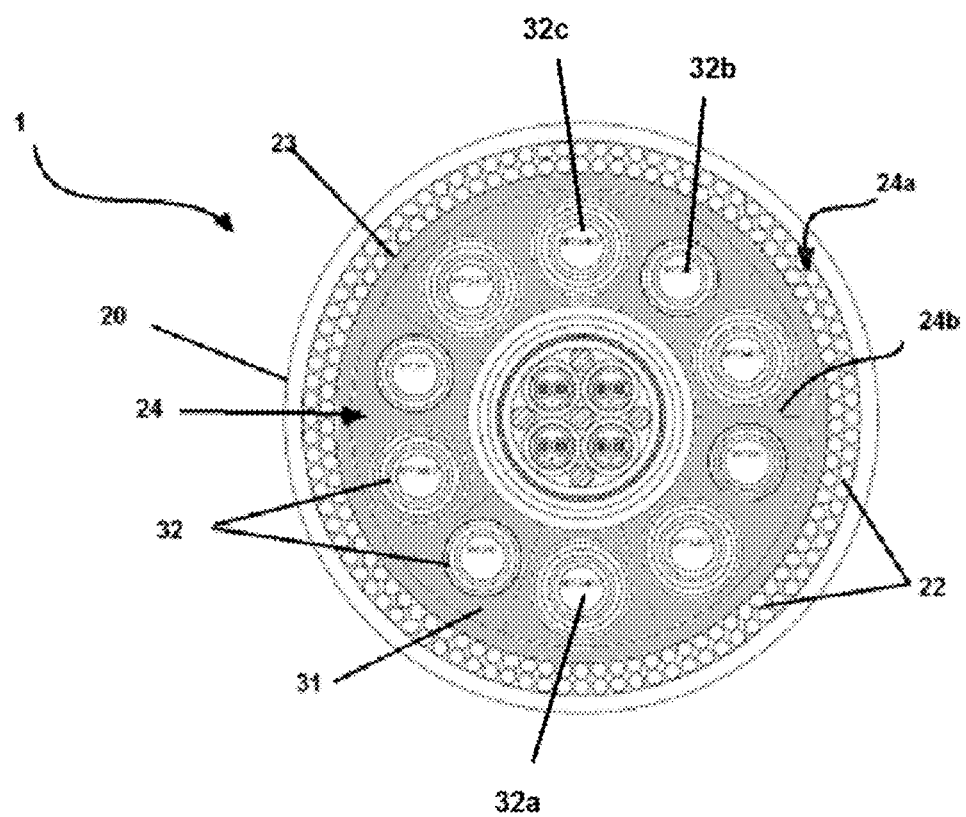
FIG. 2 is a cross sectional view in partial perspective of an embodiment of a flexible tubular comprising an outer sheath, inner sheath, functional components, armor, and filler.

Referring additionally to FIG. 2, in certain configurations tubular inner sheath 23 may be present. As in other embodiments, tubular 1 is typically flexible and, by way of example and not limitation, be an umbilical such as an umbilical suitable for use subsea. Tubular inner sheath 23 is disposed within inner void 24 and, accordingly, has a circumference small than the inner circumference of tubular outer sheath 20. Tubular inner sheath 23 defines first space 24a between an outer circumference of tubular inner sheath 23 and the inner circumference of tubular outer sheath 20 and second space 24b within inner void 24 inside tubular inner sheath 23. In these embodiments, filler 31 is disposed within and substantially fills second space 24b. Armor 22, which may comprise steel or other wire such as a mesh or other collection of wire, may also be present and disposed within an armor void defined by first space 24a.

Figure 3:
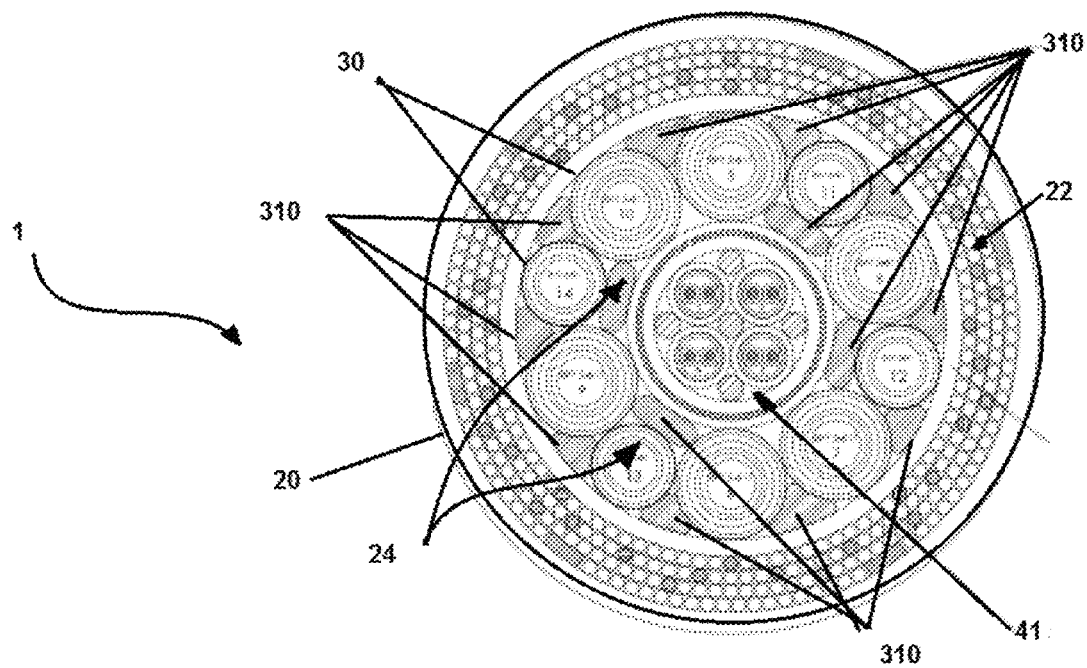
FIG. 3 is a cross sectional view in partial perspective of an embodiment of a flexible tubular comprising an outer sheath, inner sheath, functional components, armor, and shaped fillers.

Referring now to FIG. 3, in a further embodiment tubular 1 comprises tubular outer sheath 20 defining inner void 24; a plurality of core assemblies 30 disposed within inner void 24; and a plurality of fillers 310 disposed about core assemblies 30 within and substantially filling inner void 24.

Figure 4:
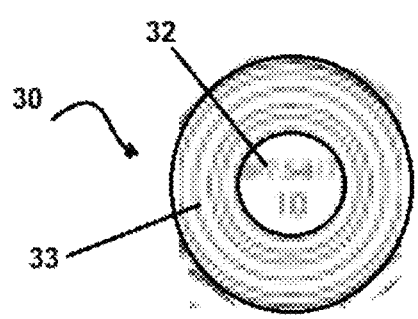
FIG. 4 is a cross sectional view in partial perspective of an exemplary component, and filler.

Filler 310 typically comprises a polymer having a density of at least 1.0 such as, by way of example and not limitation, a high density polyethylene, and may be selected or otherwise configured to provide impact and fatigue protection for one or more core elements 32 (FIG. 4). Filler 310 may be a shaped component that is round, obround, or any other shape appropriate to substantially fill the interstices created by core assemblies 30.

Referring additionally to FIG. 4, core assemblies 30 comprise one or more core elements 32, which, in turn, may comprise a fluid hose, an electrical conductor, a fiber optic conductor, or the like, or a combination thereof. As these are conventional items, they are generally shown as core element 32.

Core assemblies 30 also typically comprise one or more shaped extruded polymers layer 33 configured to help give tubular 1 (FIG. 3) hoop strength in a crush situation. Extruded polymer layer 33 is typically shaped with a substantially rounded outer circumference and extruded around core element 32 in a separate process which typically does not bind polymer layer 33 to core element 32. The selected shape may be adapted and configured to help provide crush stiffness to tubular 1 and may be a rounded shape, an obround shape, an S-Z stranded shape, a helically stranded shape, or the like, or a combination thereof. If rounded, the rounded shape may provide core assemblies 30 comprising rounded extruded polymer layer 33 an ability to twist within the stranding process. Further still, extruded polymer layer 33 may be configured to provide impact and fatigue protection for soft components within inner void 24.

Figure 5:
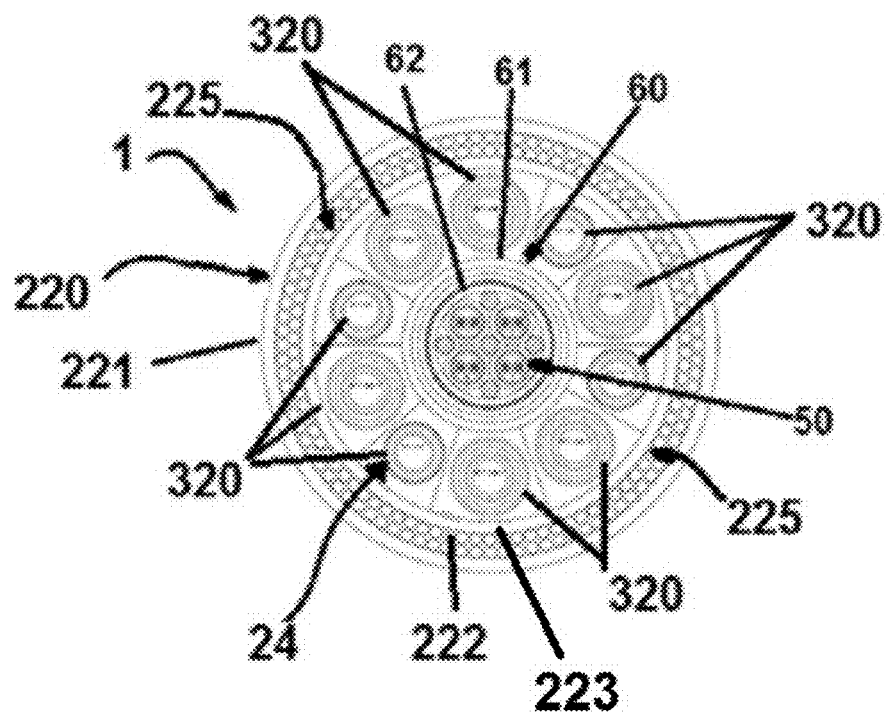
FIG. 5 is a cross sectional view in partial perspective of an embodiment of a flexible tubular comprising an outer sheath, inner sheath, functional components, armor, and shaped fillers.

Referring now to FIG. 5, in a further embodiment, tubular 1 comprises tubular outer sheath 220 defining inner void 24 and a plurality of core assemblies 320 disposed within inner void 24.

Tubular outer sheath 220 may further comprise outer surface 221 defining an outer circumference, inner sheath 223 comprising an inner surface defining an inner circumference in which outer sheath void 225 exists between outer surface 221 and inner sheath 223, and armor 222 disposed within outer sheath void 225.

Figure 6:
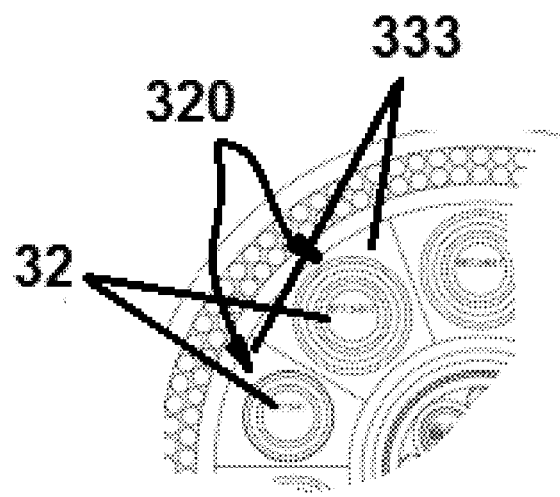
FIG. 6 is a cross sectional view in partial perspective of a portion of the embodiment of FIG. 5.

Referring additionally to FIG. 6, in certain configurations tubular 1 further comprises substantially tubular inner jacket 60 disposed within inner void 24. In these configurations, each core assembly 320 is disposed within inner void 24 intermediate inner sheath 223 and outer surface 61 of inner jacket 60 and extruded polymer layer 333 (FIG. 6) is shaped to substantially fill inner void 24 between outer sheath 220 and outer surface 61 of inner jacket 60.

Core assemblies 320 comprise one or more core elements 32 and polymer layer 333 which is extruded about core elements 32 in a separate, single pass process that does not bond polymer layer 333 to the core elements 32 of their respective core assembly 30. Polymer layer 333 defines a filler that typically comprises a polymer having a density of at least 1.0, typically a high density polyethylene, and may be selected or otherwise configured to provide impact and fatigue protection for one or more core elements 32. As with the other embodiments, core elements 32 may comprise a fluid hose, an electrical conductor, a fiber optic conductor, or the like, or a combination thereof.

In these embodiments, extruded polymer layer 333 is shaped to substantially and precisely fit about core elements 32 without leaving an exposed sharp edge. Typically, each polymer layer 333 is further shaped to interface with the remaining core assemblies 330 (FIG. 5) to substantially fill inner void 24 when core assemblies 330 are disposed with inner void 24. The shape may comprise an outer arcuate shape adapted to allow core assembly 330 to fit inside inner void 24 which is adapted to be able to twist within a stranding process. The shape may also comprise an outer sector or locking shape adapted to provide lateral stability for tubular 1, an S-Z stranded shape, a helically stranded shape, or the like, or a combination thereof. The shape may also be configured to provide impact and fatigue protection for soft components, hoop strength in a crush situation, crush stiffness, and the like, or a combination thereof.

Figure 7:
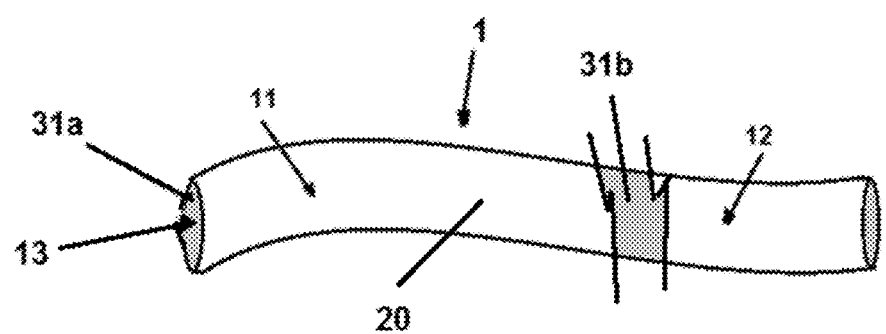
FIG. 7 is a representational view of an embodiment of a flexible tubular comprising a region or greater filler density and a region of lesser filler density.

Referring now to FIG. 7, in a further embodiment, tubular 1 comprises outer sheath 20 defining interior conduit 13 which further comprises first defined region 11 and second defined region 12. This configuration can comprise any of the embodiments described herein above. As described above, one or more functional components such as core elements 32 (e.g., FIG. 1) are disposed within interior conduit 13, either by themselves or as part of core assemblies (e.g. core assembly 30 (FIG. 3) or core assembly 320 (FIG. 6)).

First filler 31a, comprising a first density of at least 1.0, is disposed within and substantially fills first region 11 and second filler 31b, comprising a second density with a density of at least 1.0 that is different than the first density, is disposed within and substantially fills second region 12. First filler 31a and second filler 31b are chosen or otherwise adapted to comprise a predetermined characteristic such as a characteristic sufficient to improve crush protection provided to the functional components core elements 32 (e.g., FIG. 1), core assembly 30 (FIG. 3), and/or core assembly 320 (FIG. 6)). First filler 31a and/or second filler 31b may comprise a two piece filler, a conventional design, a split and folded over shape, or the like, or a combination thereof.

As with other embodiments, inner shell 60 (FIG. 5) may be present and disposed intermediate outer sheath 20 and functional components 30 (FIG. 1). Inner shell 60 may comprise interior surface 62 (FIG. 5) defining interior void 50 (FIG. 5) and outer surface 61 (FIG. 5), and functional components 30 are disposed within interior void 50. In this configuration, interior conduit 13 is defined by the area between an interior of outer sheath 20 and outer surface 62 of inner shell 60.

As with other embodiments, armor such as armor 225 (FIG. 5) may be disposed within and/or about conduit 13.

In all of these embodiments, tubular 1 is typically flexible and, by way of example and not limitation, be an umbilical such as an umbilical suitable for use subsea. In all of these embodiments, core elements 32 (e.g. FIG. 6) may comprise a fluid hose, an electrical conductor, a fiber optic conductor, or the like, or a combination thereof. All of these embodiments may comprise substantially tubular inner jacket 60 (FIG. 5) disposed within inner void 24, where inner void 24 is defined interiorly by outer surface 61 of inner jacket 60 and the various fillers described herein substantially fill inner void 24 between the respective outer sheath and outer surface 61 of inner jacket 60.

In the operation of preferred embodiments, referring generally to FIG. 1, flexible tubular 1, which may be an umbilical, may be constructed by determining a strength for filler 31 to achieve a predetermined objective for flexible tubular 1. Typically, flexible tubular 1, e.g. an umbilical, is as described above and comprises outer sheath 20 which defines interior void 24. A specific filler density is determined which will achieve the predetermined objective, the density being at least 1.0. Once these determinations occur, filler 31 is obtained where filler 31 comprises the required specific filler density, e.g. a plastic or other polymer material comprising a density of at least 1.0. One or more core elements 32, core assemblies 30 (FIG. 3), and/or core assemblies 320 (FIG. 6) may be disposed within interior void 24 and may comprise one or more conventional, functional elements such as hoses or cables. Typically, these core elements 32, core assemblies 30, and/or core assemblies 320 are disposed in interior void 24 which is then substantially filled with filler 31 such that filler 31 typically surrounds these core elements 32, core assemblies 30, and/or core assemblies 320 in interior void 24.

In certain multi-region embodiments such as illustrated in FIG. 7, a plurality of fillers 31 are desired. For example, first filler 31a may comprise a desired buoyancy characteristic whereas second filler 31b may comprise a stability characteristic. In this manner, first region 11 may be heavier than second region 12, allowing first region 11 to remain more stabile when deployed, e.g. subsea, with respect to second region 12 which can be more buoyant. In these embodiments, first filler 31a comprises a first specific filler density to achieve a first characteristic for first region 11 and second filler 31b comprises a second specific filler density to achieve a second characteristic for second region 12. One of the first specific filler density and the second filler density may be greater than the second the other density. First region 11 is substantially filed with the first filler and second region 12 is substantially filed with the second filler.

If armor is used, e.g. armor 22 (FIG. 2, FIG. 3) or armor 225 (FIG. 5), such armor may comprise a wire, e.g. a metal wire such as steel, to provide tensile strength. For example, armor 22 or 225 may be wound at low lay angles from 8 to 12 degrees. The extruded polymer shape may then be used to provide crush stiffness to the functional components.

The foregoing disclosure and description of the inventions are illustrative and explanatory. Various changes in the size, shape, and materials, as well as in the details of the illustrative construction and/or illustrative methods may be made without departing from the spirit of the invention.

What is claimed is:

1. A tubular, comprising:
   a) a tubular outer sheath defining an inner void;
   b) a plurality of core assemblies disposed within the inner void; and
   c) a plurality of shaped fillers, each of the plurality of shaped fillers comprising a polymer with a density of at least 1.0, the shaped fillers disposed about the plurality of core assemblies within the inner void and comprising a shape which substantially conforms to an outer boundary a nearest core assembly to substantially fill interstices created by core assemblies within the inner void, the shaped fillers configured to give the tubular hoop strength in a crush situation.

2. The tubular of claim 1, wherein the core assemblies further comprise at least one core assembly comprising:
   a) a core element; and
   b) an extruded polymer layer, the polymer layer adapted to give the tubular hoop strength in a crush situation, the extruded polymer layer extruded around the core element in a separate process that does not bond the polymer layer to the core element, the extruded polymer layer's shape configured to provide crush stiffness to the tubular.

3. The tubular of claim 1, wherein the extruded polymer layer comprises a rounded shape adapted to allow the shaped polymer layer to twist within the stranding process.

4. The tubular of claim 1, wherein the extruded polymer layer comprises high density polyethylene.

5. The tubular of claim 1, wherein the extruded polymer layer is adapted to provide impact and fatigue protection for soft components within the inner void.

6. The tubular of claim 1, wherein the extruded polymer layer comprises at least one of a rounded shape, an obround shape, an S-Z stranded shape, or a helically stranded shape.

7. The tubular of claim 1, wherein:
   a) the tubular comprises a flexible umbilical cable; and
   b) the core assemblies comprise at least one of a fluid hose, an electrical conductor, and a fiber optic cable.

8. A method of manufacturing a tubular, comprising of:
   a) disposing a plurality of core assemblies within an inner void defined by an interior surface of an outer sheath of a tubular; and
   b) substantially filling the inner void with a plurality of shaped fillers disposed about the core assemblies, each shaped filler comprising a shape which substantially conforms to an outer boundary a nearest core assembly, the shaped fillers comprising a polymer with a density of at least 1.0, the fillers adapted to give the tubular hoop strength in a crush situation.

9. The method of manufacturing a tubular of claim 8, further comprising creating a core assembly by extruding a polymer layer about a core element, the polymer layer shaped to substantially smoothly surround the core element.

10. The method of manufacturing a tubular of claim 9, further comprising:
    a) disposing an armor about the core element prior; and
    b) extruding the polymer layer about the armor.

11. The method of manufacturing a tubular of claim 10, further comprising using armor comprising a metal adapted to provide tensile strength with a winding at low lay angles from around 8 degrees to around 20 degrees.

* * * * *